United States Patent [19]

Drazick

[11] 3,758,248

[45] Sept. 11, 1973

[54] INJECTION PLASTIC FEEDER

[76] Inventor: Herman J. Drazick, 34480 Commerce Rd., Fraser, Mich. 84026

[22] Filed: Dec. 20, 1972

[21] Appl. No.: 316,773

Related U.S. Application Data

[63] Continuation of Ser. No. 118,688, Feb. 25, 1971, abandoned.

[52] U.S. Cl............. 425/145, 425/229, 425/245 NS
[51] Int. Cl............................. B29f 1/08, B29f 1/05
[58] Field of Search.................... 425/145, 243, 245, 425/DIG. 224, DIG. 229

[56] References Cited
UNITED STATES PATENTS

| | | | |
|---|---|---|---|
| 3,189,948 | 6/1965 | Whitney............................ | 425/144 |
| 3,535,742 | 10/1970 | Marcus............................. | 425/149 |
| 3,023,458 | 3/1962 | Seymour........................... | 425/146 |
| 3,530,539 | 9/1970 | Gellert............................. | 425/DIG. 229 |

FOREIGN PATENTS OR APPLICATIONS

| | | | |
|---|---|---|---|
| 911,028 | 11/1962 | Great Britain................ | 425/245 NS |
| 658,976 | 3/1963 | Canada............................ | 425/247 |
| 1,930,518 | 1/1970 | Germany...................... | 425/245 NS |
| 1,042,226 | 8/1958 | Germany...................... | 425/245 NS |
| 953,965 | 4/1964 | Great Britain................ | 425/245 NS |

*Primary Examiner*—J. Spencer Overholser
*Assistant Examiner*—David S. Safran
*Attorney*—Robert A. Sloman

[57] ABSTRACT

An injection molding apparatus including upper and lower die plates and at least one die cavity therein; a main feeder channel is provided in one of the die plates to feed plasticized material to the die cavity; the feeder channel intersects a valve assembly having a chamber in communication with the die cavity through a metering orifice; a needle valve is disposed in the valve assembly adapted to selectively open and close the orifice in response to a pressure differential for shut-off of plastic material flow from the valve chamber into the die cavity at the parting line of the cavity to prevent drooling of material and flash production.

1 Claim, 6 Drawing Figures

INVENTOR
HERMAN J. DRAZICK

BY Cullen, Settle, Sloman & Cantor

ATTORNEYS

INVENTOR
HERMAN J. DRAZICK

BY Cullen, Settle, Sloman & Cantor
ATTORNEYS

INJECTION PLASTIC FEEDER

This is a continuation of U.S. Pat. application Ser. No. 118,688, filed Feb. 25, 1971 now abandoned.

BACKGROUND AND SUMMARY OF THE INVENTION

The present invention relates in general to injection molding apparatuses for injection molding plastic articles and more in particular to an improved feeder and shut-off valve arrangement to intermittently interupt the flow of plasticized material into the die cavity.

Conventional injection molding apparatuses have an upper and lower die plate in which the upper die plate is movable towards and away from the lower die plate. One or a plurality of die cavities are provided in either the upper or lower die plate, which are adapted to be filled with plasticized material when the die plates are closed to thereby shape the molded article.

Conventionally, all of the die cavities are interconnected by so called gates which in turn are in communication with a sprue which receives plasticized material from a melting oven. The plasticized material is injected at a predetermined pressure through the sprue of the die assembly and along the interconnecting gates into the individual die cavities where the molded articles are formed. At the end of the molding operation, including a suitable time delay for curing of the material in the die cavity, the die plates separate from each other for removal of the molded articles from the die cavities. In this conventional arrangement, the finished articles, when ejected from the die cavities, are all interconnected by the plastic material which remains in the gates after the injection pressure has been shut-off, forming a spider like structure. Thus, the individual molded articles have to be separated from the interconnecting strings of material requiring additional mechanical or manual work operations at increased time and cost. Furthermore, with this conventional construction, undesirable flash is produced around the edges of the die cavities where the gates join the cavities.

This conventional arrangement of injection molding between dies is still widely employed in the industry, although its disadvantages are clearly evident in the waste produced by this arrangement due to the gated interconnection of the die cavities, considerably adding to the cost of the molded article.

The present invention provides an improved material feed and injection arrangement for an injection molding apparatus of the type herein referred to, to largely overcome the above mentioned disadvantages of conventional construction.

In the present improved arrangement, the individual die cavities of the injection molding apparatus are individually supplied with plasticized material under pressure from a common main feeder channel extending through one of the dies and which itself is not in direct communication with any of the die cavities. The main feeder channel is supplied with plasticized material by means of a conventional sprue arrangement.

Each of the die cavities is in communcation with the main feeder channel by means of separate shut-off valve assemblies which have a movable valve member therein which immediately shuts-off the flow of plasticized material into the die cavity at the moment when injection pressure is reduced, thus, any further flow of material is being interupted. The material remaining in the separate valve assemblies and in the main feeder channel are kept in plasticized condition by means of separate heating elements.

In the present improved construction, the individual molded articles are kept separate from each other and thus need no additional work operations except for the usual finishing operations, and no waste material is produced. The present improved construction likewise eliminates the provision of gates in anyone of the die faces for interconnection of the die cavities with the feeder channel and further prevents the formation of flash around the die cavities.

Additional advantages and particular novel features will become evident or particularly be pointed out by reference to the following detailed description of a preferred embodiment of the invention as illustrated in the attached drawings.

BRIEF DESCRIPTION OF THE DRAWINGS

The accompanying drawings illustrate a preferred embodiment of the invention in which.

DETAILED DESCRIPTION OF THE INVENTION

Figure 1:
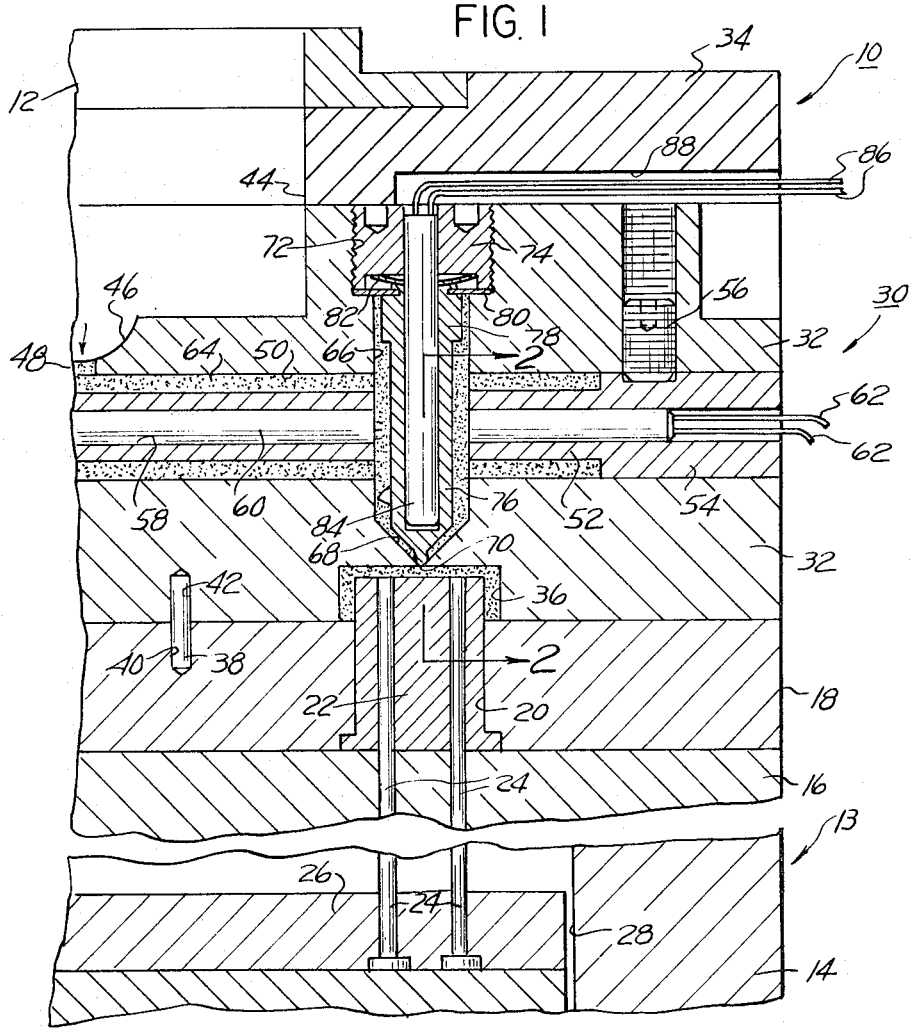
FIG. 1 is a center cross-section through one half of the die plate assembly of an injection molding apparatus embodying the present improved construction.

Referring first to FIG. 1, there is illustrated a die plate and support assembly 10 incorporated in an injection molding apparatus of any known kind, which structure has been omitted from the drawing for clarity and which is not deemed necessary to be described in any detail since such die injection molding apparatuses are well known in the art.

The die plate and support assembly 10 is arranged around a center line 12 and it will be understood that the die assembly 10 is symetrical around said center line.

The die plate and support assembly 10 is composed of a lower die assembly 13 comprising a stationary base member 14 which supports a back-up plate 16 on which is located a lower die plate 18. The members 14, 16 and 18 are stationary.

The lower die plate 18 has an aperture 20 which is adapted to receive an interchangable die 22 having a portion extending above the surface of the die plate 18. Conversely, as is known, the die 22 could be formed integral with the die plate 18, as for instance shown in FIG. 5. One or a plurality of push rods 24 extend upwardly through the die 22 and downwardly through the plate 16 for attachment to a piston member 26 which is actuatable by any known actuating means (not shown) within a chamber 28 formed in the base plate 14. The push rods 24 and 26 comprise an ejection means for the molded article formed around the die 22, as will be explained.

Positioned above the lower die assembly 13 is an upper, movable die assembly 30 in axial alignment therewith around the center line 12. The upper, movable die assembly 30 is composed of an upper die plate 32 which is suitably attached to a back-up plate 34 by conventional fastening means (not shown). It will be understood that the upper die assembly 30 is vertically movable towards or away from the stationary lower die assembly 13 along the center axis 12 by conventional means usually employed in closing die arrangements.

Figure 5:
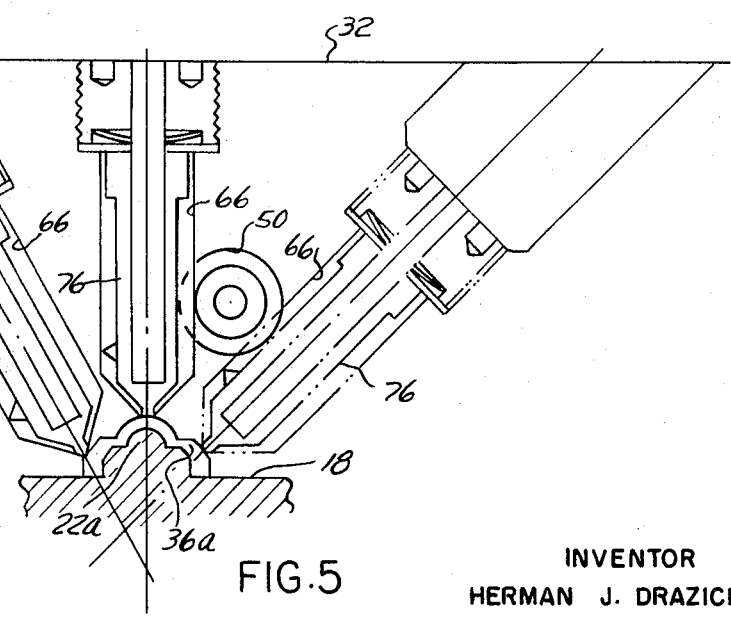
FIG. 5 illustrates possible alternate valve positions in accordance with the present invention.

The upper die plate 32 is provided with a cavity 36 which opens to the surface of the die plate in axially centered alignment with the die 22 which, when the die is closed, extends into the die cavity 36 as shown in FIG. 1. The die cavity 36, which may be contoured in any desired shape, as for instance illustrated in FIG. 5, provides in conjunction with the contoured face of the die 22, the shaping means for an article to be formed in the die cavity 36 by means of plasticized material introduced into the die cavity.

In the closed position of the dies 18 and 32, a dowel pin 38 is adapted to register within axially aligned bores 40 and 42, respectively, in the opposed dies to provide accurate alignment of the dies when closed relative to the die cavity 36 and die 22. It is understood that the dowel pin 38 is secured in either one of the apertures 40 or 42, as the case may be.

The upper die assembly 30 is provided with a central recess 44 axially disposed around center line 12 and which extends into the upper die 32. The bottom of the recess 44 is provided with a cavity 46 which forms a sprue to receive heated plasticized material from a source (not shown) usually associated in molding apparatuses of this type.

The sprue 46 is in communication with an internal passage 50 by means of an orifice 48. The passage 50 extends internally across the upper die member 32 and is open at one end to receive a cylindrical rod 52 axially disposed therein. The cylindrical rod 52 is provided with an enlarged head portion 54 substantially equal in diameter to the internal diameter of the passage 50 for interference fit therein to seal the passage 50 to the outside. It will be understood that the cylindrical rod 52 is similarly constructed at the opposite end of the passage 50 or, conversely, the passage 50 at the opposite side of the die 32 may terminate in a blind end. The cylindrical rod 52 is additionally secured within the passage 50 by means of a set screw 56 disposed in the upper die 32 which, when tightened, engages the enlarged head portion 54 of the cylindrical rod.

The cylindrical rod 52 is provided with an axial bore 58 adapted to receive a longitudinal heating element 60 which is connected by conduits 62 to a source of electric current (not shown). Thus, by introduction of current into the heating rod 60 through the conduits 62, the cylindrical rod 52 will be heated to thereby heat the passage 50 to maintain the plasticized material 64 within the passage, received from the sprue 46, in fluidic condition.

Figure 2:
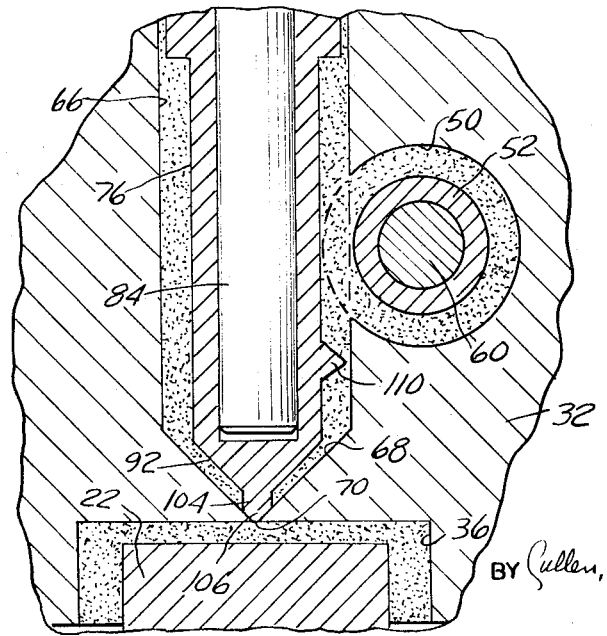
FIG. 2 is an enlarged fragmentary cross-section through the arrangement shown in FIG. 1, as seen in the direction of the arrows 2—2.

The horizontal passage 50 is offset from the center of the die 22 and cavity 36 and is tangentially intersected by a vertical passage 66 as shown in FIG. 2. The vertical passage 66 forms a material receiving chamber and extends downwardly through the die 32 towards the cavity 36. At the lower end, the passage 66 terminates into a conical end portion having inwardly converging side surfaces 68 terminating into a relatively small orifice 70, open to the cavity 36. Thus, in general terms, plasticized fluidic material under pressure is delivered from the sprue 46 through the orifice 48 into the heated passage 50 and from there into the vertical passage 68 downwardly along the conical portion 68 and through the orifice 70 into the die cavity 36.

The upper end of the vertical passage 66 terminates into a counter-bore 72 adapted to receive a threaded plug member 74 for closure of the passage 66.

A movable valve member 76 is disposed within the passage 66 for slight axial movement therein between the plug member 74 and the lower end of the passage 66. The upper end of the valve member 76 is provided with an enlarged head portion 78 adapted for abutment against a flexible seal plate 80 which is held in place in the counter-bore 72 by the plug member 74. The inner end of the plug member 74 is provided with a recess adapted to retain resilient bias means 82 which may be springs of the Belleville type which normally tends to urge the valve member 76 downwardly in the passage 66 to close the orifice 70 by means to be described.

Figure 1A:
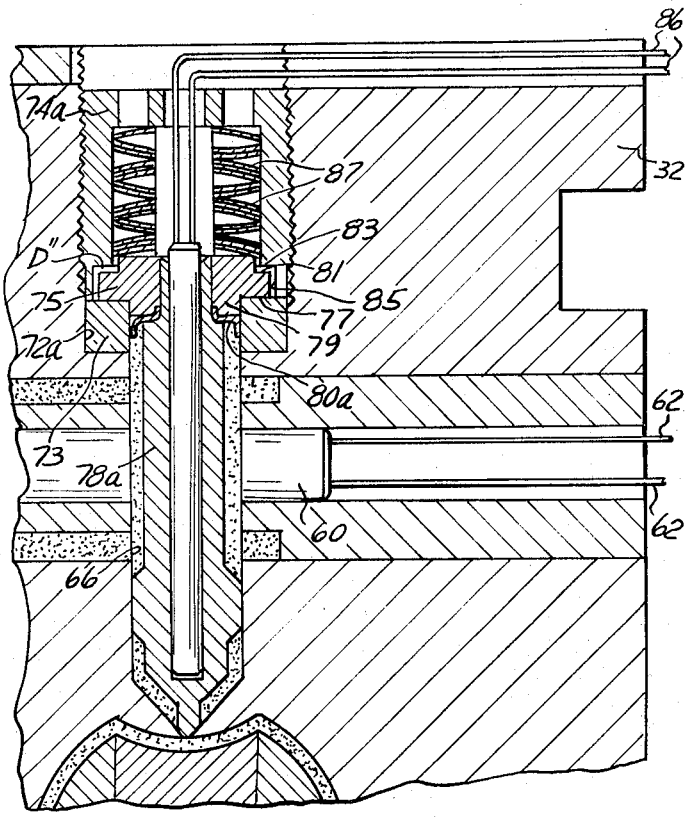
FIG. 1a is a view showing a modified valve assembly.

Referring to FIG. 1a there is illustrated a slightly different embodiment of the head portion of the valve member 78a and closure plug 74a.

In this instance, the counter-bore 72a, in addition to the plug 74a, receives a spacer 73 at the bottom thereof. The head portion 75 of the valve member 78a is provided with a first radial undercut defining a planar surface 77 adapted for abutment upon the spacer 73 and an axial portion 79 of reduced diameter for extension into the bore of the spacer 73 to close the valve passage 66. A flexible seal 80a is retained between the head portion 75 and the bore of the spacer 73.

The upper end of the head portion 75 is provided with a second radial undercut defining a planar surface 81 normally spaced a predetermined distance "D" from the upper planar surface 83 of a recess 85 provided in the lower end of the plug 74a.

The plug 74a contains a plurality of oppositely grouped dished spring members 87 between the head portion 75 and the upper end of the plug to normally retain the head portion in engagement upon the spacer 73. The distance "D" between surfaces 81–83 defines the extent of valve movement as will be pointed out hereafter.

Both, the valve member 76 and plug 74, are axially bored in order to receive a longitudinal heating element 84 which is suitably connected by conduits 86 to a source of electrical current (not shown), which may be the same source as that for the conduits 62. The conduits 86 extend outwardly of the upper die 32 through a suitable recess or slot 88 provided in the lower surface of the back-up plate 34. Thus, plasticized material retained in the vertical passage 66 as received from the passage 50 will be maintained in fluidic condition by introduction of current into the heat rod 84.

Figure 3:
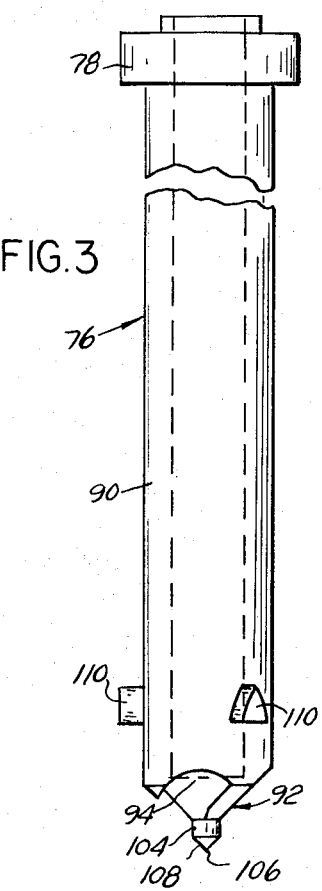
FIG. 3 is an enlarged separate illustration of the valve member of the present invention.
Figure 4:
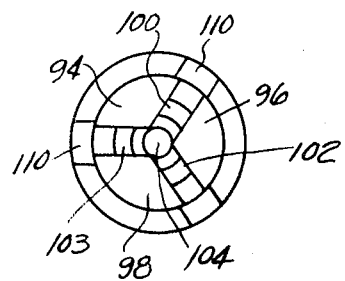
FIG. 4 is an end view of the valve member of FIG. 3.

With particular reference to FIGS. 3 and 4, the movable valve member 76 is composed of a cylindrical body portion 90 which, at its lower end, terminates into a conical portion 92.

As more particularly seen in FIG. 4, the conical portion 92, which tapers inwardly towards the central axis of the main body portion 90, is composed of three radially spaced land sections 94, 96 and 98 respectively, which are divided from each other by bridging portions 100, 102 and 103 respectively. All of these portions terminate into a needle point tip portion 104 which has a sharp pointed end 106 formed by conical side surfaces 108. The angle of the conical side surface 108 of the pointed tip portion 104 relative to the central axis "X" of the valve member 76, corresponds to the angle of the conical surface 68 and orifice 70 of the passage 66. Thus, when the valve member 76 is in closed position, the conical surface 108 of the tip portion 104 sealingly closes the orifice 70 directly at the parting line of the die cavity 36. The design may be such, that the pointed tip 104 at the end of the valve member 76 in the closed position may extend a minimal distance into the cavity 36, causing a slight indentation to appear at the center of the finish molded article which, however, has no adverse affect. Due to the sealing closure of the needle point valve tip within the orifice 70, the formation of flash around the orifice is positively prevented.

The cylindrical body portion 90 of the valve member 76 near its lower end is provided with a plurality of circumferentially equally spaced protrusions 110 which extend outwardly from the body portion 90. In assembly of the valve member 76, as seen in FIGS. 1 and 2, the protrusions 110 serve as alignment members by abutment against the inner surface of the passage 66 to maintain the valve member 76 in correctly axially aligned position relative to the orifice 70.

In order to effect fast and positive closure of the valve member 76, the valve member 76 is constructed such that the lower conical end portion 92 is at all times closely adjacent the internal conical surface 68 of the passage 66, as seen in FIGS. 1 and 2, providing only sufficient space to permit passage of the plasticized material 64 between the conical surfaces 92 and 68 through the orifice 70. In an actual embodiment, the total movement of the valve member 76 is restricted to 0.030 inches (3/100 of an inch), however, for certain other applications, the total movement of the valve member between open and closed position can vary between 0.020 and 0.090 of an inch. Thus, it will be appreciated that the valve member 76 can be moved into closed position by force of the spring 82 in a fraction of a second, providing a considerably improved shut-off action effectively preventing drooling and formation of flash around the orifice 70.

In operation, plasticized material such as polyethylene, polystyrene, nylon, teflon or the like synthetic material, is introduced into the die assembly 10 when the die members 18 and 32 are in closed position, as shown in FIGS. 1 and 2, by means of the recess 44 for deposit into the sprue 46. From the sprue 46, the plasticized material flows through the orifice 48 into the horizontal passage 50 around the cylindrical rod 52 and from there into the vertical passage 66 around the valve member 76. As described above, the plasticized material 64 is maintained in fluidic condition by means of electrical heating elements 60 and 84, respectively.

In normal operation, the plasticized material is pressure injected through the orifice 70 into the cavity 36 at a predetermined pressure, which may vary between 600 to 20,000 PSI depending on certain known parameters to be considered in injection molding processes. Likewise, the operating temperature of the plasticized material may vary between 300° and 600° F. depending on the type of synthetic material being used. The pressure force of the spring 82 under compression, is designed such as to be less than the injection pressure so that, upon application of injection pressure, the pressure of the plasticized material within the vertical passage 66 forces the valve member 76 upwardly into open position against the force of the spring 82 by action against the enlarged head portion 78. The plasticized material is permitted for injection at designed pressure force into the cavity 36 through the orifice 70, past the needle point 104 of the valve member, to fill the cavity around the die 22.

At a timed interval, coincident with filling of the cavity 36, the injection pressure is automatically reduced to a value below the expansion force of the spring 82 to thereby permit expansion of the spring 82 to force the valve member 76 downwardly, permitting the needle tip 104 of the valve member to sealingly close the orifice 70. As explained before, this is done in a fraction of a second immediately after reduction of injection pressure. The valve member 76 may close such, as to provide a shut-off substantially flush with the parting line of the die cavity or permit minimal extension of the needle point 106 of the valve member into the surface of the molded article, which, however, is not objectionable.

During shut-off of the injection process and subsequent removal of the finished article from the die cavity by actuation of the rejector mechanism 24–26, after the die member 32 has moved away from the lower die member 18, the heating elements 60 and 84 respectively remain energized to maintain the plasticized material remaining within the passage 50 and 66 in fluidic condition for the next injection cycle.

As schematically shown in FIG. 5, the valve assembly 66–76, instead of being disposed in vertical axially aligned position relative to the die cavity 36 and die 22, can be mounted on an angle relative to the central axis of the die cavity and die 22 and to be designed thereof as shown. Thus, as shown in FIG. 5 at the left, the valve 76 is mounted at an angle of approximately 60° relative to the surface of the die 32 and at the right, the valve 76 is shown being mounted at an angle of approximately 45° relative to the planar surface of the die 32. The operational characteristic of the valve 76 will not be affected by any type of angular mounting within the upper die 32 since the valve function is entirely controlled by the injection pressure and the force of the expansion spring 82 as previously described.

FIG. 5 also exemplarily illustrates a contoured die cavity 36a and a similarly contoured die 22a partially extending into the die cavity when the dies are closed.

It will be appreciated that the molded articles produced by the present improved feeder and shut-off valve assembly will be completely free of any flash material when ejected from the die so as to eliminate any subsequent trimming operations.

The present improved injection molding feeder and shut-off valve assembly is particularly adapted for the molding of small to medium size parts. Similarly, the present improved arrangement provides a means by which a large number of die cavities (as many as 128) may be provided in the same die assembly at a minimum spacing of 1 and ⅛ of an inch between centers. This is not possible in conventional injection molding apparatuses which require a minimum of from 5 to 6 inches between centers of the individual die cavities.

The improved die assembly of FIG. 1, for instance, could be circular around the center line 12, accommodating a plurality of die cavities 36 circumferentially equally spaced around the center line 12 of the die assembly. In the instance of multiple die cavities 36 provided in the upper die 32, a plurality of intersecting horizontal feeder channels 50 will be provided in the upper die for communication with the several individual shut-off valve channels 66.

Since each die cavity has its own shut-off valve assembly, no hot manifold is required to convey plasticized material into the several die cavities. The upper die member 32 itself serves the purpose of the conventional hot manifold.

It will be further appreciated that the present improved shut-off valve assembly for the individual die cavities, can conveniently serviced if necessary without dismantling the complete die assembly.

Although the present invention has been described and shown by means of a preferred embodiment, it will be understood that various modifications in construction and detail may be made without departing from the spirit and essential characteristic thereof, therefore, the present embodiment is to be considered in all respects as illustrative only and not restrictive, the scope of the invention being indicated by the appended claims rather than by the foregoing description.

I claim:

1. In an injection molding apparatus having a lower stationary die plate and a movable upper die plate for movement towards and away from said lower die plate, at least one die cavity provided within one of said die plates adjacent the parting line of the upper and lower die plates, said apparatus further including a source of plasticized material and means in the other die plate for receiving and storing said plasticized material for injection into said die cavity, the improvement comprising:

a first passage extending horizontally through said other die plate, said passage being in open communication with said receiving and storing means, said first passage having heating means internal thereto;

a second passage disposed at an angle to the first passage, said second passage extending through and confined within said other die plate in a direction transverse to the first passage and intersecting said first passage tangentially thereof, said second passage extending in a direction towards said cavity and terminating in an orifice at one end, and in a closure member at the other end, said second passage terminating in a conical end of constantly reduced diameter the end of which defines said orifice, said orifice being open to said cavity, said orifice further being flush with said cavity at all times, whereby said orifice is never spaced apart from said cavity; and an axially movable heated valve member disposed within said second passage for movement toward and away from said orifice;

bias means disposed between said valve member and said closure member in said second passage to normally urge said valve member towards said orifice to close said orifice to prevent communication between said second passage and said die cavity;

said valve member having means responsive to injection pressure at a predetermined magnitude exceeding the force of said bias means to thereby move said valve member away from said orifice to provide said die cavity with heated plasticized material from said storage means along said first passage into said second passage and through said orifice;

said bias means being effective to immediately move said valve member to close said orifice upon a reduction of injection pressure below the predetermined force of said bias means, whereby all portions of the molded article are contained within the cavity;

said first passage internal heating means including a cylindrical rod for axial extension therethrough;

said cylindrical rod receiving an electrical heating element and having a diameter less than the internal diameter of said first passage to permit movement of plasticized material through said first passage whereby said plasticized material in said first passage is constantly maintained in fluidic condition by application of a current to said electrical heating element;

said valve member and said closure member in said second passage being axially bored to receive an electrical heating element secured to said valve member and movable therewith to maintain said plasticized material within said second passage in fluidic condition upon application of current to said electrical heating element;

said valve member having a conical end portion matching said conical end portion of said second passage; said conical end portion of said valve member terminating into a needle tip portion adapted for extension into said orifice when said valve member is in its closed position to close off said orifice.

* * * * *